United States Patent
Nishiyama et al.

(10) Patent No.: US 11,065,962 B2
(45) Date of Patent: Jul. 20, 2021

(54) INVERTER CONTROL DEVICE

(71) Applicant: DENSO CORPORATION, Kariya (JP)

(72) Inventors: Masaki Nishiyama, Kariya (JP); Hirofumi Yamashita, Kariya (JP)

(73) Assignee: DENSO CORPORATION, Kariya (JP)

(*) Notice: Subject to any disclaimer, the term of this patent is extended or adjusted under 35 U.S.C. 154(b) by 197 days.

(21) Appl. No.: 15/968,891

(22) Filed: May 2, 2018

(65) Prior Publication Data
US 2018/0345793 A1 Dec. 6, 2018

(30) Foreign Application Priority Data

May 30, 2017 (JP) .............................. JP2017-106886

(51) Int. Cl.
*B60L 3/00* (2019.01)
*H02P 29/68* (2016.01)
*H02P 21/06* (2016.01)

(52) U.S. Cl.
CPC ............. *B60L 3/003* (2013.01); *B60L 3/0061* (2013.01); *H02P 21/06* (2013.01); *H02P 29/68* (2016.02); *B60L 2240/36* (2013.01); *B60L 2250/26* (2013.01); *B60Y 2200/92* (2013.01); *Y10S 903/906* (2013.01)

(58) Field of Classification Search
CPC ...... B60L 3/0023; B60L 3/003; B60L 3/0061; B60L 2240/36; H02P 29/68
See application file for complete search history.

(56) References Cited

U.S. PATENT DOCUMENTS

| | | | | |
|---|---|---|---|---|
| 9,889,740 B1 * | 2/2018 | Dudar | ....................... | B60L 1/02 |
| 2006/0087790 A1 * | 4/2006 | Goto | ...................... | H02H 7/122 |
| | | | | 361/103 |
| 2010/0256851 A1 | 10/2010 | Mitsutani | | |
| 2012/0079843 A1 * | 4/2012 | Ikemiya | .................... | B60P 3/20 |
| | | | | 62/186 |
| 2013/0103240 A1 * | 4/2013 | Sato | ........................ | B60L 58/25 |
| | | | | 701/22 |

(Continued)

FOREIGN PATENT DOCUMENTS

| | | | | |
|---|---|---|---|---|
| DE | 102013218092 A1 * | 3/2015 | ........ | H01M 8/04074 |
| JP | 2012-075228 A | 4/2012 | | |
| JP | 2012-205448 A | 10/2012 | | |

*Primary Examiner* — Anshul Sood
(74) *Attorney, Agent, or Firm* — Oliff PLC

(57) ABSTRACT

An inverter ECU is applied to a hybrid vehicle having an engine and a motor generator as drive power source and a motor generator control system. A drive control part generates drive signals for an inverter based on torque request to the motor generator. A temperature information acquiring part acquires an element temperature value and a cooling water temperature value as an inverter temperature value. An abnormality detection part detects whether the inverter temperature value is within a diagnosable temperature range, and performs abnormality detection for the motor generator control system when the inverter temperature value is within the diagnosable temperature range. When the inverter temperature value is not placed within the diagnosable temperature range, the energy supplied to the inverter is adjusted to move the inverter temperature value into the diagnosis allowable temperature range to correctly perform the abnormality detection.

14 Claims, 10 Drawing Sheets

(56) References Cited

U.S. PATENT DOCUMENTS

| | | | |
|---|---|---|---|
| 2014/0104902 A1* | 4/2014 | Casares | H02H 3/44 |
| | | | 363/56.01 |
| 2014/0330471 A1* | 11/2014 | Ozaki | B60L 50/51 |
| | | | 701/22 |
| 2016/0134226 A1* | 5/2016 | Najima | H02P 29/68 |
| | | | 318/472 |
| 2017/0282752 A1* | 10/2017 | Konishi | B60L 15/2054 |
| 2018/0272840 A1* | 9/2018 | Onishi | B60H 1/03 |
| 2018/0375459 A1* | 12/2018 | Tsugawa | B60L 3/0061 |

\* cited by examiner

INVERTER CONTROL DEVICE

CROSS-REFERENCE TO RELATED APPLICATION

This application is related to and claims priority from Japanese Patent Application No. 2017-106886 filed on May 30, 2017, the contents of which are hereby incorporated by reference.

BACKGROUND OF THE INVENTION

1. Field of the Invention

The present invention relates to inverter control devices for performing supply control of electric power to a motor generator as a drive power source mounted on various types of hybrid vehicles.

2. Description of the Related Art

There has been known a technique to perform abnormality detection of a motor generator control system mounted on a hybrid vehicle. For example, patent document 1, Japanese registered patent No. 4333759 has disclosed a motor generator control system mounted on a hybrid vehicle which is equipped with an electric generator and an electric motor. The controller device is configured to perform abnormality detection so as to detect occurrence of electric generator failure. An inverter is arranged at the electric generator side in the motor generator control system. The motor generator control system performs the abnormality detection of the electric generator predetermined times in a predetermined trip period of the hybrid vehicle by forcedly driving the inverter arranged at the electric generator side even if the hybrid vehicle is running by using a torque of the electric motor which uses electric power.

The motor generator control system performs the abnormality detection on the basis of a detected temperature value of the inverter without considering any information regarding behavior of the electric generator and the electric motor. In the structure of the motor generator control system previously described, it is difficult for the controller device to acquire correct temperature information of the inverter if the detected temperature value of the inverter is outside a detectable temperature range of a temperature sensor. This often causes an incorrect result of the abnormality detection. That is, it is to necessary to correctly perform the abnormality detection of the detection target under an optimum temperature state of the inverter. The optimum temperature state of the inverter indicates that a detected inverter temperature value of the inverter is within a diagnosable temperature range which is determined on the basis of the detectable temperature range of the temperature sensor.

However, the related art such as patent document 1 discloses and suggests no relationship between the detectable temperature range of the temperature sensor and the diagnosable temperature range of the inverter. The diagnosable temperature range of the inverter allows the abnormality detection of the diagnosis target such as the motor generator control system and the electric generator to be correctly performed. That is, the related art such as patent document 1 does not indicate or suggest any diagnosable temperature range of the inverter, and does not suggest any temperature range which prevents correct execution of the abnormality detection of the motor generator control system and the electric generator.

Many countries and/or regions made and enforce laws and regulations which determine an execution rate which is not less than the number of times per unit time to perform abnormality detection at the engine start of a hybrid vehicle.

In such a hybrid vehicle, when inverter failure or motor generator failure reduces the frequency of driving the hybrid vehicle by using electric power, the total frequency of driving the hybrid vehicle using the internal combustion engine increases and this state increases the amount of exhaust gas emission. The increased amount of exhaust gas emission causes environmental damage. Accordingly, when a detected inverter temperature value of the inverter is outside the specific detectable temperature range, the motor generator control system cannot correctly perform the abnormality detection. Accordingly, there is a possible defect case in which the motor generator control system mounted on a hybrid vehicle does not match and does not satisfy the laws and regulations previously described in each country or region. On the other hand, when the motor generator control system uses a temperature sensor having a wide detectable temperature range so as to conform to the laws and regulations, this increases manufacturing cost.

SUMMARY

It is therefore desired to provide an inverter control device capable of placing an inverter into an executable temperature range so as to correctly execute abnormality detection of a detection target in a motor generator control system mounted on a hybrid vehicle even if the inverter has a current temperature outside the executable temperature range.

An exemplary embodiment provides an inverter control device having an improved structure. The inverter control device is applied to a hybrid vehicle equipped with an internal combustion engine and at least a motor generator as driving power sources. The inverter control device performs behavior control of an inverter. The inverter supplies electric power to the motor generator in the hybrid vehicle. The inverter control device has a computer system including a central processing unit. The computer system is configured to provide a drive control part, a temperature information acquiring part and an abnormality detection part. The drive control part generates inverter drive signals on the basis of a torque request to the motor generator. For example, the driver of the hybrid vehicle transmits the torque request to the drive control part. The temperature information acquiring part acquires an inverter temperature value as an inverter temperature value of the inverter. For example, a temperature sensor detects a temperature of the inverter and generates an inverter temperature value. In more detail, the inverter temperature value represents an element temperature value of switching elements forming the inverter, or a cooling water temperature of cooling water. The cooling water cools the inverter.

The abnormality detection part detects whether the inverter temperature value obtained by the temperature information acquiring part is within a diagnosable temperature range, and performs an abnormality detection of the motor generator control system when the inverter temperature value obtained by the temperature information acquiring part is within the diagnosable temperature range. It is preferable to determine the diagnosable temperature range on the basis of a detectable temperature range of the temperature sensor.

When the inverter temperature value is outside the diagnosable temperature range, the abnormality detection part adjusts a supply amount of energy to be supplied to the inverter so as to place the Inverter temperature value of the inverter into the diagnosable temperature range and for the abnormality detection part to correctly perform the abnormality detection. For example, there are electric power and heat energy as the energy to be supplied to the inverter.

The inverter control device according to the present invention detects occurrence of abnormality of the MG control system, i.e. detects motor generator control system failure. The motor generator control system failure includes abnormality of demagnetization characteristics of the motor generator, abnormality of torque characteristics of the motor generator, occurrence of a short circuit or disconnection in phase windings of the motor generator, abnormality of sensors such as temperature sensor failure, etc.

The temperature state in which the inverter temperature value is outside the diagnosable temperature range includes a low temperature state in which the inverter temperature value is lower than the temperature lower limit value in the diagnosable temperature range and a high temperature state in which the inverter temperature value is higher than the temperature upper limit value in the diagnosable temperature range. The abnormality detection part increases the supply amount of energy to be supplied to the inverter so as to increase the inverter temperature value in the low temperature state. Further, the abnormality detection part prohibits or reduces the supply amount of energy to be supplied to the inverter so as to reduce the inverter temperature value in the high temperature state.

Under cold conditions, which corresponds to the low temperature state of a hybrid vehicle, because the inverter has a low temperature, it is difficult to correctly perform the abnormality detection when the hybrid vehicle starts to use the engine. When the hybrid vehicle starts to use the engine under cold conditions, it is effective to supply energy to the inverter so as to increase the temperature value of the inverter and to allow the temperature value of the inverter into the diagnosable temperature range. For example, the energy to be supplied to the inverter is electric power or heat energy so as to increase the inverter temperature value within the diagnosable temperature range. When the inverter temperature value reaches the diagnosable temperature range, the abnormality detection part correctly perform the abnormality detection. This abnormality detection control previously described makes it possible to increase an execution frequency of performing the abnormality detection for the motor generator control system within a predetermined period of time counted from the engine start of the hybrid vehicle. This control makes it possible to quickly avoid a disadvantageous condition of the hybrid vehicle which does not match the laws and regulations even if the hybrid vehicle is in severe cold environment such as under cold conditions.

When the inverter control device uses one or more temperature sensors having a wide temperature range, which expands the diagnosis executable temperature range, so as to satisfy the maximum temperature range when the hybrid vehicle starts to use the engine, this increases the manufacturing cost of the inverter control device and the MG control system.

The inverter control device according to the present invention has the improved structure capable of adjusting the energy to be supplied to the inverter without using any expensive temperature sensor, and capable of increasing the number of times to perform the abnormality detection within the predetermined period of time counted from the engine start of the hybrid vehicle.

Still further, in the improved structure of the inverter control device, the diagnosis executable temperature range is determined and adjusted on the basis of the detectable temperature range of the inverter temperature sensor. This avoids the incorrect execution of the abnormality detection in the condition which is outside the temperature detectable range of each temperature sensor.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
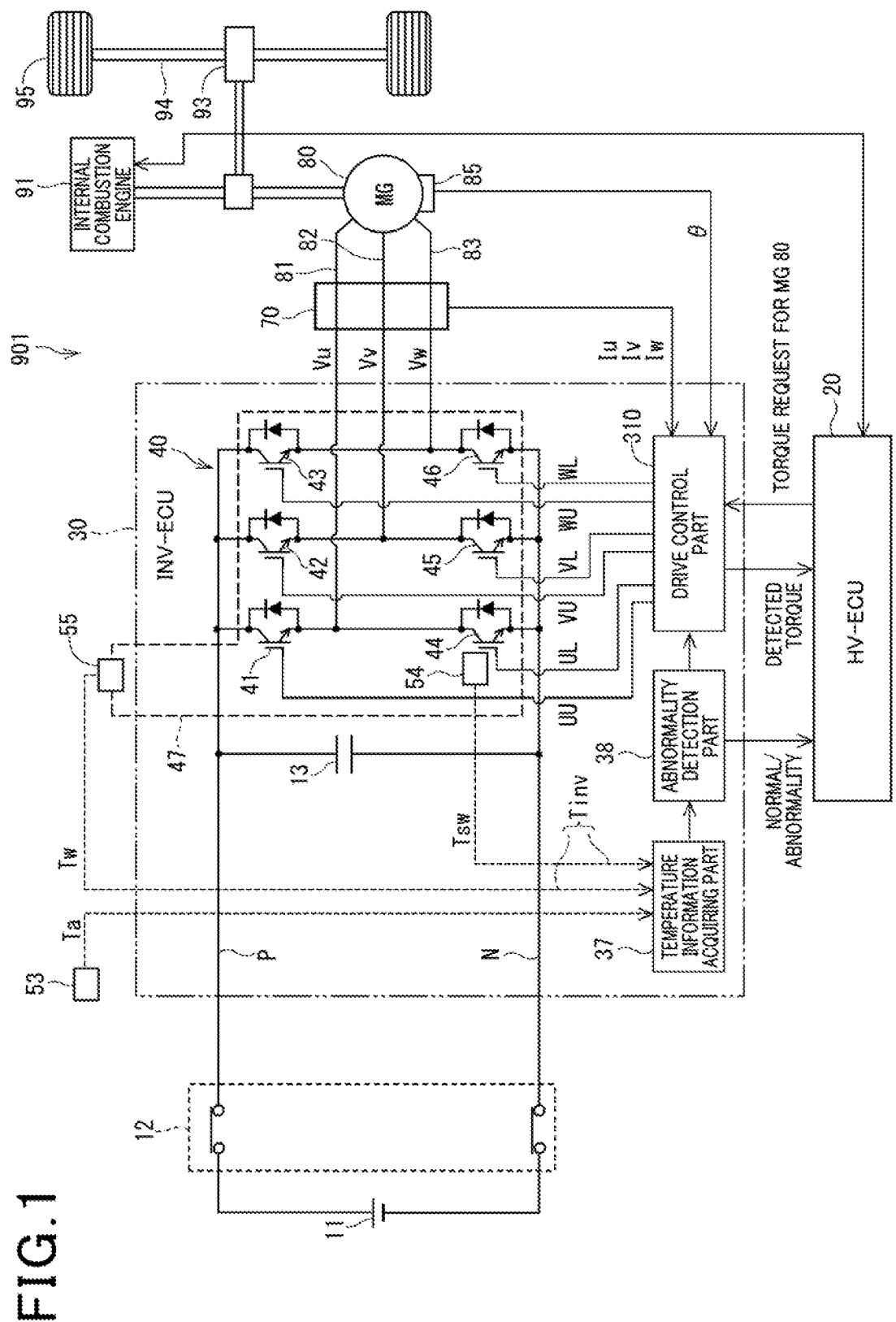
FIG. 1 is a view showing a schematic structure of a motor generator control system mounted on a hybrid vehicle, to which an INV ECU as an inverter control device according to a first exemplary embodiment and a second exemplary embodiment of the present invention is applied.

Hereinafter, various embodiments of the present invention will be described with reference to the accompanying drawings. In the following description of the various embodiments, like reference characters or numerals designate like or equivalent component parts throughout the several diagrams.

A description will be given of a structure, behavior and effects of an inverter electric control unit (the INV-ECU) 30 as an inverter control device according to first to third exemplary embodiments and a modification thereof with reference to FIG. 1 to FIG. 11. Through the first to third exemplary embodiments, the INV ECU 30 corresponds to the inverter control device according to the present invention. The INV ECU 30 is applied to a hybrid vehicle equipped with an internal combustion engine and one or more motor generators 80 (MG 80) as power sources. The INV ECU 30 performs the control of behavior of an inverter which supplies an electric power to the MG 80.

Figure 8:
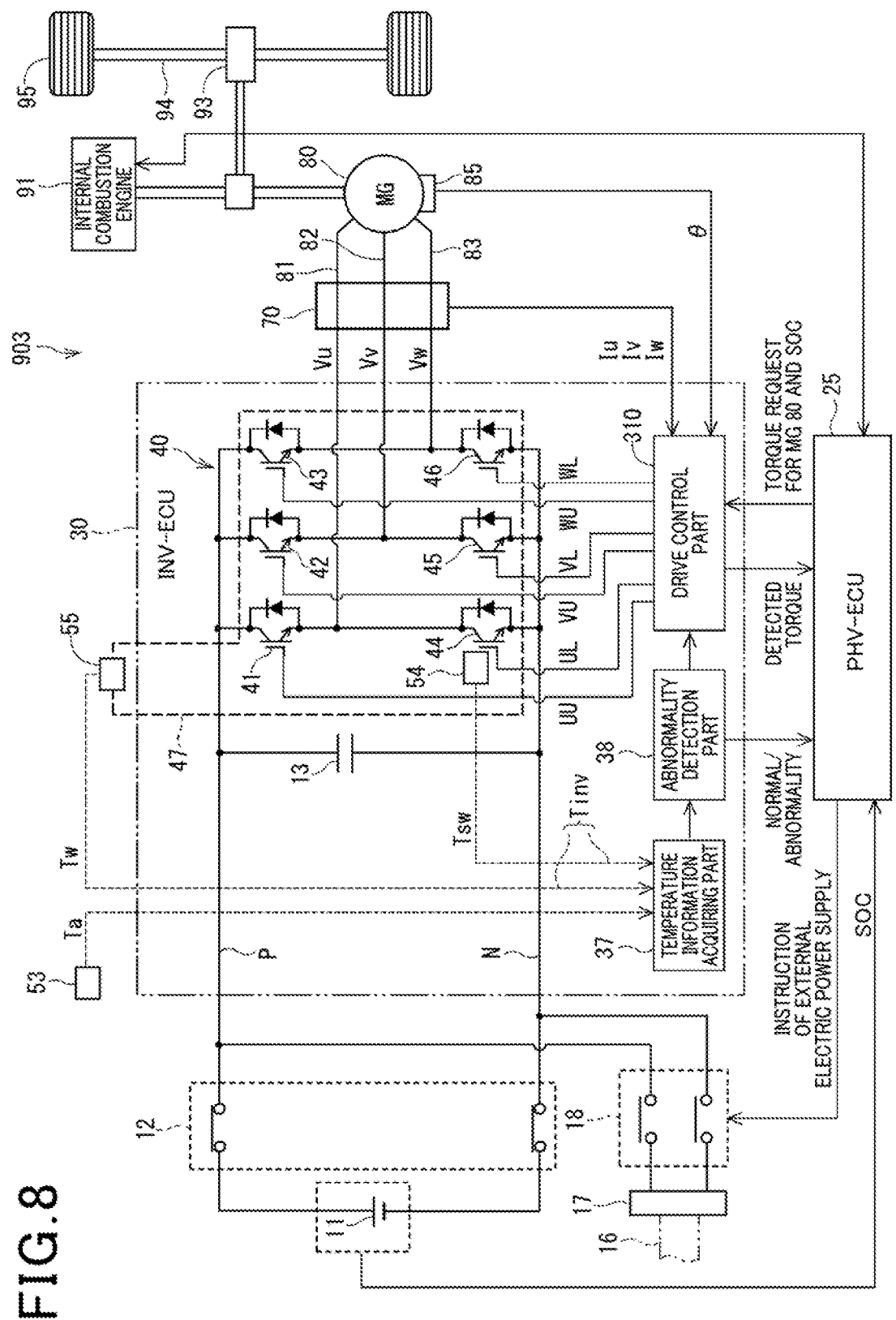
FIG. 8 is a view showing a schematic structure of a motor generator control system mounted on a plug-in type hybrid vehicle 903, to which an INV ECU according to a third exemplary embodiment of the present invention is applied.

FIG. 1 and FIG. 8 show the structure of a hybrid vehicle 901 equipped with the INV ECU 30 and a plug-in type hybrid vehicle 903 equipped with the INV ECU 30 according to the first to third exemplary embodiment, respectively. However, the concept of the present invention is not limited by those exemplary embodiments. For example, it is possible to apply the INV ECU 30 to various types of hybrid vehicles equipped with double motor generators which are connected with each other through a power split mechanism.

Through the first to third exemplary embodiments which will be described later, the motor generator (MG) control system includes a battery 11, an inverter 40, the MG 80, various control devices (for example, the INV ECU 30 as the inverter control device according to the exemplary embodiments) for the battery 11, the inverter 40, the MG 80, etc., various types of sensors capable of detecting physical properties values as control parameters, and various types of devices and members used for the power supply control to the MG 80.

The INV ECU 30 as the inverter control device according to the present invention detects occurrence of abnormality of the MG control system such as motor generator control system failure. The motor generator control system failure includes abnormality of demagnetization characteristics of the MG 80, abnormality of torque characteristics of the MG 80, occurrence of a short circuit or disconnection in phase windings of the MG 80, abnormality of sensors such as temperature sensor failure, etc.

The INV ECU 30 according to the first and second exemplary embodiments is applied to the MG control system for hybrid vehicles. The INV ECU 30 according to the third exemplary embodiment is applied to the MG control system for plug-In hybrid vehicles.

First Exemplary Embodiment

A description will be given of the INV ECU 30 as the inverter control device according to the first and second exemplary embodiments with reference to FIG. 1 to FIG. 7.

FIG. 1 is a view showing a schematic structure of the MG control system mounted on the hybrid vehicle 901, to which the INV ECU 30 as the inverter control device according to the first exemplary embodiment and the second exemplary embodiment is applied.

A description will now be given of a schematic structure of the MG control system of the hybrid vehicle 901 with reference to FIG. 1.

A battery 11 is composed of a rechargeable battery capable of performing charging and discharging such as a nickel-metal hydride battery, a lithium ion battery, etc. A positive electrode of the battery 11 is connected to a high voltage line P, and a negative electrode of the battery 11 is connected to a low voltage line N. The high voltage line P and the low voltage line N are power supply lines.

It is acceptable to use a storage device such as an electric double layered capacitor instead of using the battery 11. A power source relay 12 is arranged on the power supply lines, through which the battery 11 is connected with the inverter 40, and is capable of connecting the battery 11 to the inverter 40, and of disconnecting the battery 11 from the inverter 40.

A capacitor 13 is arranged at the battery side 11 in the inverter so as to smooth an input voltage of the inverter 11 supplied from the battery 11. It is possible for the MG control system to have a structure in which an inverter voltage at both the end terminals of the capacitor 13, as the input voltage of the inverter 11 is detected by using a voltage sensor (not shown).

Further, it is acceptable for the MG control system to have a booster converter which is arranged between the battery 11 and the inverter 40, which is capable of boosting the voltage of the battery 11, i.e. the input voltage of the inverter 40.

Still further, it is acceptable for the MG control system to have a DC-DC converter which is arranged on a branch line, which is branched from the power supply lines, so as to reduce the input voltage and to supply and charge a reduced voltage to an auxiliary battery. The auxiliary battery supplies a low voltage to one or more auxiliary devices.

The inverter 40 is composed of switching elements 41 to 46. The switching element 41 to the switching element 46 form three phase upper and lower arms. In more detail, the switching element 41 forms the U phase upper arm. The switching element 42 forms the V phase upper arm. The switching element 43 forms the W phase upper arm. The switching element 44 forms the U phase lower arm. The switching element 45 forms the V phase lower arm. The switching element 46 forms the W phase lower arm.

The switching element 41 to the switching element 46 receives drive signals UU, UL, VU, VL, WU and WL transmitted from a drive control part 310 in the INV ECU 30. The switching element 41 to the switching element 46 converts a direct current power (DC power) having the input voltage supplied from the battery 11 to an alternating current power (AC power) on the basis of the received drive signals UU, UL, VU, VL, WU and WL.

The inverter 40 supplies the AC power to the MG 80. That is, the inverter 40 supplies a U phase voltage Vu, a V phase voltage and a W phase voltage in the converter AC power to a U phase winding, a V phase winding and a W phase winding of the MG 80, respectively. The U phase voltage Vu, the V phase voltage and the W phase voltage are generated in the inverter 40 based on voltage instructions, i.e. the drive signals UU, UL, VU, VL, WU and WL which have been calculated by, and transmitted from the drive control part 310.

As previously described, the switching elements 41, 42 and 43 belong to the U phase upper arm, the V phase upper arm and the W phase upper arm, respectively, and the switching elements 44, 45 and 46 belong to the U phase lower arm, the V phase lower arm and the W phase lower arm, respectively. For example, each of the switching element 41 to the switching element 46 in the inverter 40 is composed of an insulated gate bipolar transistor (IGBT). Each IGBT is equipped with a flywheel diode which allows a current flowing from its emitter as a low voltage side to its collector as a high voltage side. It is acceptable to use another type of switching elements such as a silicon carbide (SIC) element or a metal oxide semiconductor field effect transistor (MOS FET) instead of using such IGBT.

In the structure of the inverter 40 shown in FIG. 1, an element temperature sensor 54 is arranged near the switching element 44 in the U phase lower arm so as to detect a temperature of the switching element 44 (as the element temperature value Tsw of the switching element 44). For example, the element temperature sensor 54 is composed of a heat sensitive diode.

It is acceptable to arrange the element temperature sensor 54 near a specific element only, which has an estimated maximum temperature or minimum temperature in the overall switching elements 41 to 46 in the inverter 40.

It is also acceptable to arrange element temperature sensors which correspond to the switching elements 41 to 46, respectively, so as to detect a temperature of each of the switching elements 41 to 46. In the latter case, the drive control part 310 in the INV ECU 30 calculates and uses an average temperature value of the overall detected temperature values or a specific temperature value selected from the overall detected temperature values.

As shown in FIG. 1, a cooling water flow passage 47 is arranged around the inverter 40 so as to cool heat energy generated in the inverter 40 due to the power supply into the switching elements 41 to 46. A cooling water temperature sensor 55 detects a temperature of the cooling water (the cooling water temperature Tw of the cooling water) which flows in the cooling water flow passage 47.

The INV ECU 30 as the inverter control device according to the first exemplary embodiment uses, as an inverter temperature value Tinv of the inverter 40, both the element temperature value Tsw and the cooling water temperature value Tw.

On the other hand, it is acceptable for the INV ECU 30 according 1o to the second and third exemplary embodiments to use, as the inverter temperature of the inverter 40, one of the element temperature value Tsw and the cooling water temperature Tw, or another detected temperature other than the element temperature value Tsw and the cooling water temperature Tw.

An atmospheric temperature sensor 53 detects a temperature of a substrate or a temperature of atmosphere, as an atmospheric temperature value Ta, around the INV ECU 30 mounted on the hybrid vehicle 901. It is acceptable to use another temperature sensor to detect the atmospheric temperature value Ta.

In the structure of the hybrid vehicle 901 shown in FIG. 1, the atmospheric temperature sensor 53 is mounted on a location outside of the INV ECU 30.

The motor generator, i.e. the MG 80 is a three phase alternating current motor of a permanent magnet type, for example. The MG 80 has the function of an electric motor and the function of an electric generator. The function of an electric motor generates a torque capable of driving drive wheels 95 of the hybrid vehicle 901. The function of an electric generator converts the torque supplied from the engine 91 and the drive wheels 95 to an electrical power. The MG 80 is connected to a drive shaft 94 of the drive wheels 95 through gears of a transmission assembly.

When the MG 80 generates the drive torque, the generated drive torque is transmitted to the drive shaft 94 through the gear of the transmission assembly. The drive shaft 94 rotates by the transmitted torque, and the drive wheels 95 are thereby driven.

A current sensor 70 is arranged on a current line which is connected to two phases or three phases of the three phase windings 81, 82 and 83 in the MG 80. The current sensor 70 detects a U phase current Iu, a V phase current Iv and a W phase current Iw.

It is possible to calculate one phase current value on the basis of the remaining two phase current values by using the Kirchhoff's law.

A rotation sensor 85 shown in FIG. 1 is a resolver, capable of detecting a rotary angle θ of a rotor in the MG 80.

A hybrid electronic control unit (HV-ECU) 20 performs various control operations of driving the hybrid vehicle 901 on the basis of information and control signals, detection signals transmitted from the INV ECU 30, a battery electronic control unit (the battery ECU, not shown), an engine electronic control unit (the engine ECU, not shown), etc.

The input and output control signals and detection signals transmitted between the HV-ECU 20 and each of the battery ECU, the engine ECU, etc. are omitted from drawings.

The INV ECU 30 has the inverter 40, the drive control part 310, a temperature information acquiring part 37 and the abnormality detection part 38.

A detailed structure of the INV ECU 30 will be explained with reference to FIG. 3.

Each of those ECUs is composed of a computer system such as a microcomputer, etc. which is comprised of a central processing unit (CPU, not shown), a read only memory (ROM), a random access memory (RAM), an input/output interface (I/O interface), bus lines, etc. The CPU, the ROM, the RAM and the I/O interface are connected together through the bus lines. Each of those ECUs reads programs stored in the ROM and executes the programs so as to perform various control processes. Further, each of those ECUs has a dedicated electric circuits as hardware units to perform specific control processes without using the programs. Still further, each of those ECUs transmits various types of information with each other through an in-vehicle network using a controller area network (CAN).

Figure 2:
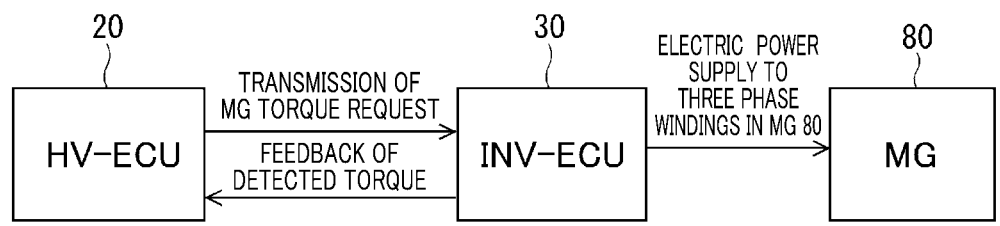
FIG. 2 is a view showing a brief structural relationship between a HV ECU, an INV ECU and a motor generator in the MG control system according to the first and second exemplary embodiments shown in FIG. 1.

FIG. 2 is a view showing a brief structural relationship between the HV ECU 20, the INV ECU 30 and the MG 80 in the MG control system shown in FIG. 1. As shown in FIG. 2, the HV-ECU 20 transmits, to the INV ECU 30, a MG torque request, which is requested by the driver of the hybrid vehicle 901.

The INV ECU 30 performs a current control process so as to adjust a current to be supplied to the three phase windings in the MG 80 on the basis of the received MG torque request and other control signals. The INV ECU 30 performs the vector control process for each of a d axis and q axis in the current so as to adjust the current supplied to the MG 80. The MG 80 is driven by the three phase power supply from the inverter 40.

Figure 3:
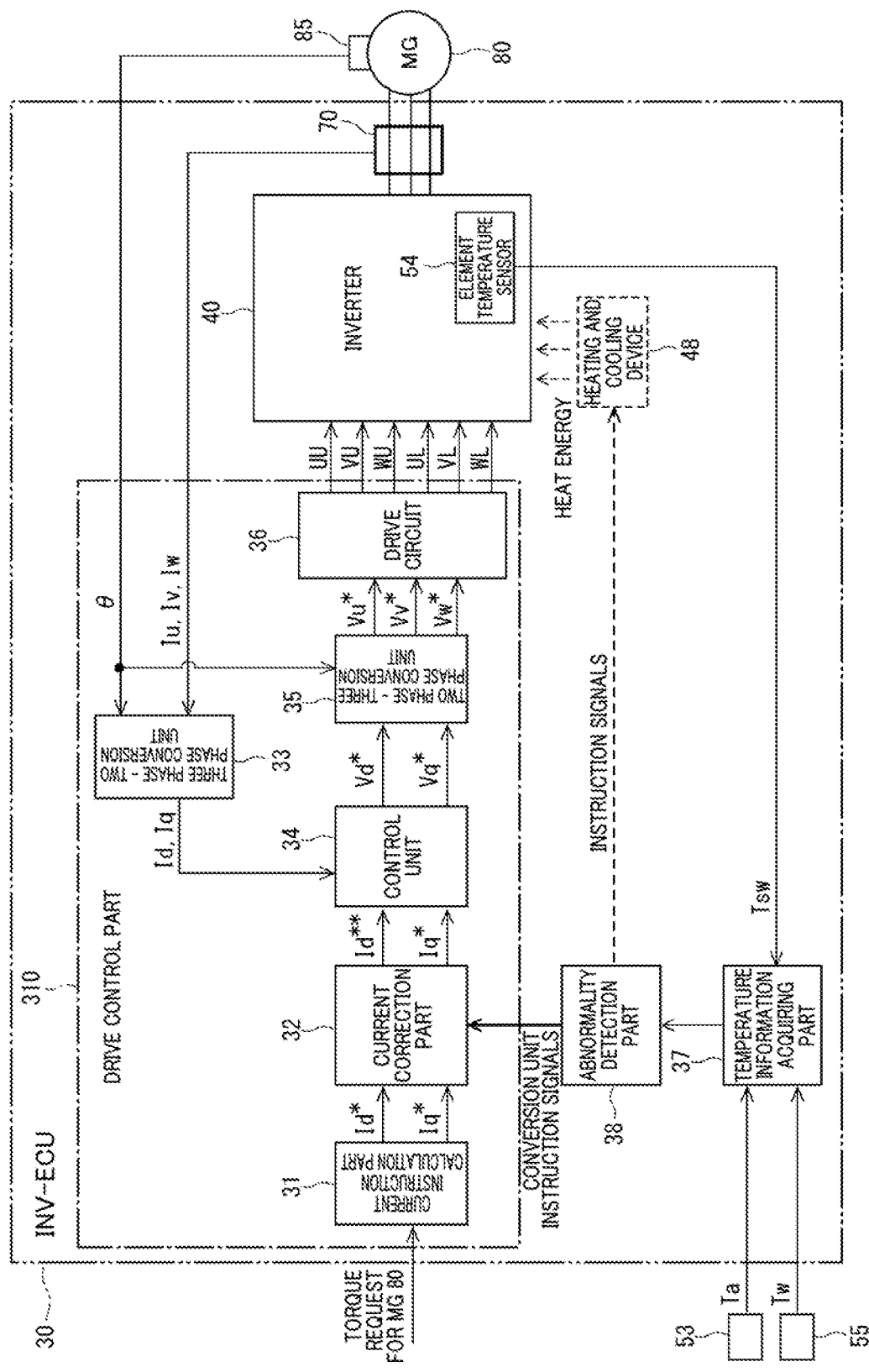
FIG. 3 is a view showing a structure of the INV ECU shown in FIG. 1 according to the first exemplary embodiment and the second exemplary embodiment of the present invention.

FIG. 3 is a view showing a detailed structure of the INV ECU 30 as the inverter control device shown in FIG. 1 according to the first exemplary embodiment and the second exemplary embodiment of the present invention. As shown in FIG. 3, the drive control part 310 performs a vector control process and a current feedback control process. The drive control part 310 has a current instruction calculation part 31, a three phase-two phase conversion part 33, a control unit 34, a two phase-three phase conversion part 35 and a drive circuit 36. The drive control part 310 in the INV ECU 30 according to the first exemplary embodiment has a current correction part 32.

The current instruction calculation part 31 calculates a d axis current instruction value id* and a q axis current instruction value iq* by using a map and equations (not shown) on the basis of the MG torque request. For example, the MG torque request is generated on the basis of a driver's request of the hybrid vehicle 901, as previously described.

In order to reduce a temperature rise in the inverter 40 due to increasing of the amount of the power supply to the inverter 40, or to reduce the temperature of the inverter 40, the current correction part 32 in the INV ECU 30 shown in FIG. 3 adjusts the current instruction values such as the d axis current instruction value id* and the q axis current instruction value iq* on the basis of the instruction signals generated by and transmitted from the abnormality detection part 38 in the INV ECU 30 shown in FIG. 3.

Specifically, the current correction part 32 shown in FIG. 3 increases an absolute value of the d axis current instruction value Id* of a negative value, and transmits the increased d axis current instruction value id* to the control unit 34 in order to increase a temperature of the inverter 40. For example, when the MG torque request is zero, the d axis current instruction value id* before the correction is zero, and the d axis current instruction value id* after the correction becomes a negative value.

On the other hand, when the MG torque request is not zero and the temperature of the inverter 40 is reduced, the current correction part 32 reduces the absolute value of the d axis current instruction value id* of a negative value.

In order to prevent the generation of an unintended MG torque request, the current correction part 32 does not correct the q axis current instruction value Iq*. For example, when the MG torque request is zero, the current correction part 32 does not correct the q axis current instruction value iq* of zero before and after the correction to the d axis current instruction value id*. This allows the power supply to the inverter 40 to be maintained in the overall conditions of the hybrid vehicle 901.

The three phase-two phase conversion part 33 shown in FIG. 3 performs a coordinate transformation process of transforming the U phase current Iu, the V phase current Iv and the W phase current Iw detected by the current sensor 70 to the d axis current values Id and the q axis current value Iq on the basis of an electrical angle θ.

The control unit 34 shown in FIG. 3 performs a proportional integral process to calculate a d axis voltage instruction value Vd* and a q axis voltage instruction value Vq* so that a difference between the corrected d axis current instruction value id* and the d axis current value Id is converged to zero, and a difference between the q axis current instruction value Iq* and the q axis current value Iq is converged to zero.

The two phase-three phase conversion part 35 performs the coordinate transformation of transforming the d axis voltage instruction value Vd* and the q axis voltage instruction value Vq* to the three phase voltage instruction values Vu*, Vv* and Vw*, and transmits the three phase voltage instruction values Vu*, Vv* and Vw* to the drive circuit 36.

When receiving the three phase voltage instruction values Vu*, Vv* and Vw* transmitted from the two phase-three phase conversion part 35, the drive circuit 36 generates the drive signals UU, UL, VU, VL, WU and WL on the basis of the received three phase voltage instruction values Vu*, Vv* and Vw* to the inverter 40.

For example, there is a possible case in which the output function, i.e. the output torque of the MG 80 in the MG control system for the hybrid vehicle 901 reduces or the MG 80 does not generate any torque. In this case, the number of times of driving the hybrid vehicle 901 by using the output torque of the internal combustion engine increases, and this increases the amount of exhaust gas emissions when compared with a case in which the hybrid vehicle 901 drives under the usual hybrid vehicle driving by using the torque of the MG 80.

Many countries and regions have various laws and regulations to perform the abnormality detection of the MG control system when the hybrid vehicle 901 starts to operate, and to perform appropriate measures when the abnormality detection indicates that an abnormality occurs in the MG control system. Further, those laws and regulations has determined that the number of times to perform the abnormality detection within a predetermined period of time is not less than a predetermined number of times (i.e. not less than a regulation value of a monitoring rate) after the engine start of a vehicle, i.e. the hybrid vehicle 901.

In order to correctly perform the abnormality detection, it is strongly necessary to satisfy that the inverter temperature value Tinv detected by the temperature sensor is within the detectable temperature range (i.e. the dynamic range) of this temperature sensor. In other words, there is a possible case in which the abnormality detection causes an incorrect judgment in a temperature region which is outside the detectable temperature range of the temperature sensor.

The INV ECU 30 as the inverter control device according to the first exemplary embodiment determines, as a diagnosis executable temperature range, the inverter temperature range Tinv capable of performing the correct abnormality detection, which corresponds to the detectable temperature range of the temperature sensor. For example, the INV ECU 30 determines that it is difficult to perform the abnormality detection when the detected inverter temperature value Tinv is lower than a temperature lower limit value of the diagnosis executable temperature range when the hybrid vehicle 901 starts to use the engine under cold conditions.

Instead of performing the determination process previously described, it is acceptable to use a temperature sensor having a wide detectable temperature range which corresponds to a maximum temperature range when the hybrid vehicle 901 starts. However, this increases the manufacturing cost of the inverter control device.

In order to avoid the latter procedure, the INV ECU 30 according to the first exemplary embodiment adjusts the amount of energy to be supplied to the inverter 40 so as to move the detected inverter temperature value Tinv into the diagnosis executable temperature range when at least the detected inverter temperature value Tinv is outside the diagnosis executable temperature range. In order to perform this operation, the INV ECU 30 has the temperature information acquiring part 37 and the abnormality detection part 38. The temperature information acquiring part 37 detects, as at least the inverter temperature value Tinv, the element temperature value Tsw detected by and transmitted from the element temperature sensor 54, the cooling water temperature value Tw detected by and transmitted from the cooling water temperature sensor 55. Further, the temperature information acquiring part 37 receives the atmospheric temperature value Ta detected by and transmitted from the atmospheric temperature sensor 53.

As shown in FIG. 1 and FIG. 3, the temperature information acquiring part 37 generates temperature information regarding the received those temperature values, and transmits the temperature information to the abnormality detection part 38.

The abnormality detection part 38 compares the temperature value in the temperature information transmitted from the temperature information acquiring part 37 with a predetermined temperature threshold value, and determines whether the abnormality detection can be performed on the basis of the comparison result.

When the comparison result indicates to hardly perform the abnormality detection, the abnormality detection part 38 adjust the energy to be supplied to the inverter 40 so as to correctly perform the abnormality detection. This procedure will be referred to as the energy supply control process.

When the temperature value in the temperature information transmitted from the temperature information acquiring part 37 varies to allow the abnormality detection to be correctly performed, the abnormality detection part 38 performs the abnormality detection of the MG control system whether the MG control system is in a normal state or an abnormality state. This diagnosis process will be referred to as the abnormality detection process. That is, the abnormality detection part 38 performs the energy supply control process and the abnormality detection process.

The behavior of the INV ECU 30 is based on the diagnosis results. Further, the abnormality detection part 38 transmits the diagnosis results to the HV ECU 20 so as to perform a warning process to the driver of the hybrid vehicle 901.

The INV ECU 30 as the inverter control device according to the first exemplary embodiment uses electric power as the energy to be supplied to the inverter 40. On the other hand, the INV ECU 30 as the inverter control device according to the second exemplary embodiment uses heat energy as the energy to be supplied to the inverter 40. For example, the INV ECU 30 according to the second exemplary embodiment, which will be described later, has a heating and cooling device 48 designated by dotted lines shown in FIG. 3, uses instruction signals designated by a dotted arrow to be supplied to the heating and cooling device 48, and uses heat energy to be supplied to the inverter 40.

A description will now be given of the energy supply control process and the abnormality detection process performed by the INV ECU 30 according to the first exemplary embodiment with reference to FIG. 4, FIG. 5, FIG. 6A and FIG. 6B.

Figure 4:
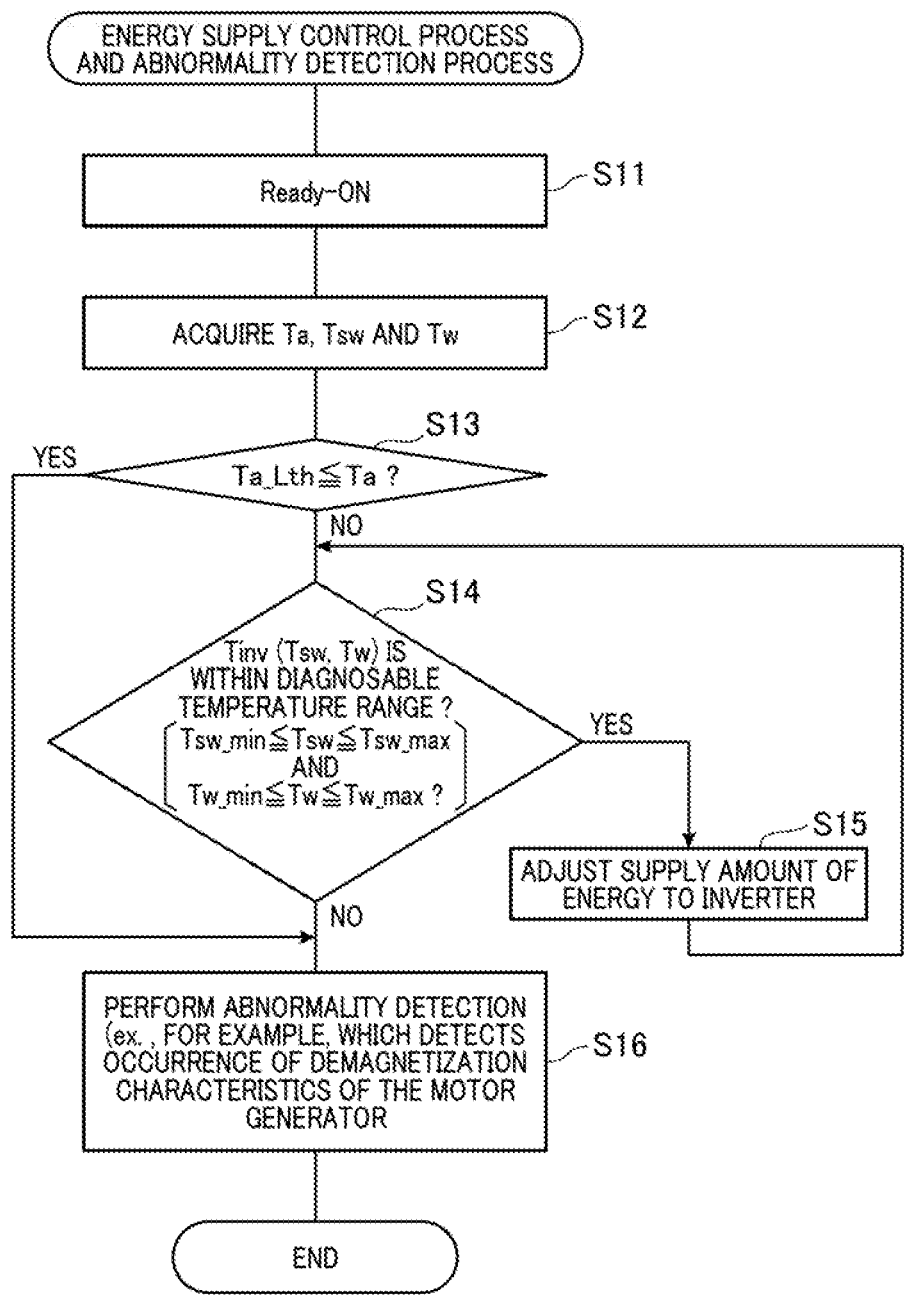
FIG. 4 is a view showing a flow chart of an energy supply control process and an abnormality detection process performed by an abnormality detection part in the INV ECU shown in FIG. 1 according to the first exemplary embodiment and the second exemplary embodiment.

FIG. 4 is a view showing a flow chart of an energy supply control process and the abnormality detection process performed by the abnormality detection part 38 in the INV ECU 30 shown in FIG. 1 according to the first exemplary embodiment.

In step S11, the driver of the hybrid vehicle 901 performs a ready-on operation so as to start the engine. The operation flow progresses to step S12.

In step S12, the temperature information acquiring part 37 acquires the atmospheric temperature value Ta, the element temperature value Tsw and the cooling water temperature value Tw. The temperature information acquiring part 37 transmits, to the abnormality detection part 38, the temperature information regarding the atmospheric temperature value Ta, the element temperature value Tsw and the cooling water temperature value Tw. The operation flow progresses to step S13.

In step S13, the abnormality detection part 38 detects whether the received atmospheric temperature value Ta is not less than a predetermined low temperature threshold value Ta_Lth.

When the detection result in step S13 indicates affirmation ("YES" in step S13), i.e. indicates that the received atmospheric temperature value Ta is not less than the predetermined low temperature threshold value Ta_Lth, the abnormality detection part 38 determines to correctly perform the abnormality detection process. The operation flow progresses to step S16.

The atmospheric temperature value Ta may be less than the low temperature threshold value Ta_Lth under cold conditions. However, it s highly unlikely the atmospheric temperature value Ta exceeds a high temperature (for example, not less than 80° C.) in an intense heat season. The inverter control device according to the first exemplary embodiment does not use a high temperature threshold value for the atmospheric temperature value Ta.

It is possible for the INV ECU 30 as the inverter control device according to the first exemplary embodiment to correctly perform the abnormality detection process because the atmospheric temperature value Ta is not less than the low temperature threshold value Ta_Lth excepting in the cold season. For this reason, in step S13 before the process in step S14, the abnormality detection part 38 detects whether the received atmospheric temperature value Ta is not less than a predetermined low temperature threshold value Ta_Lth. This reduces the period of detecting the judgment process in many cases, and is possible to quickly perform the abnormality detection process, and to reduce the process in step S14.

When the atmospheric temperature value Ta is less than the predetermined low temperature threshold value, and the abnormality detection part 38 detects that the received atmospheric temperature value Ta is less than the predetermined low temperature threshold value Ta_Lth ("NO" in step S13), the operation flow progresses to step S14.

Figure 5:
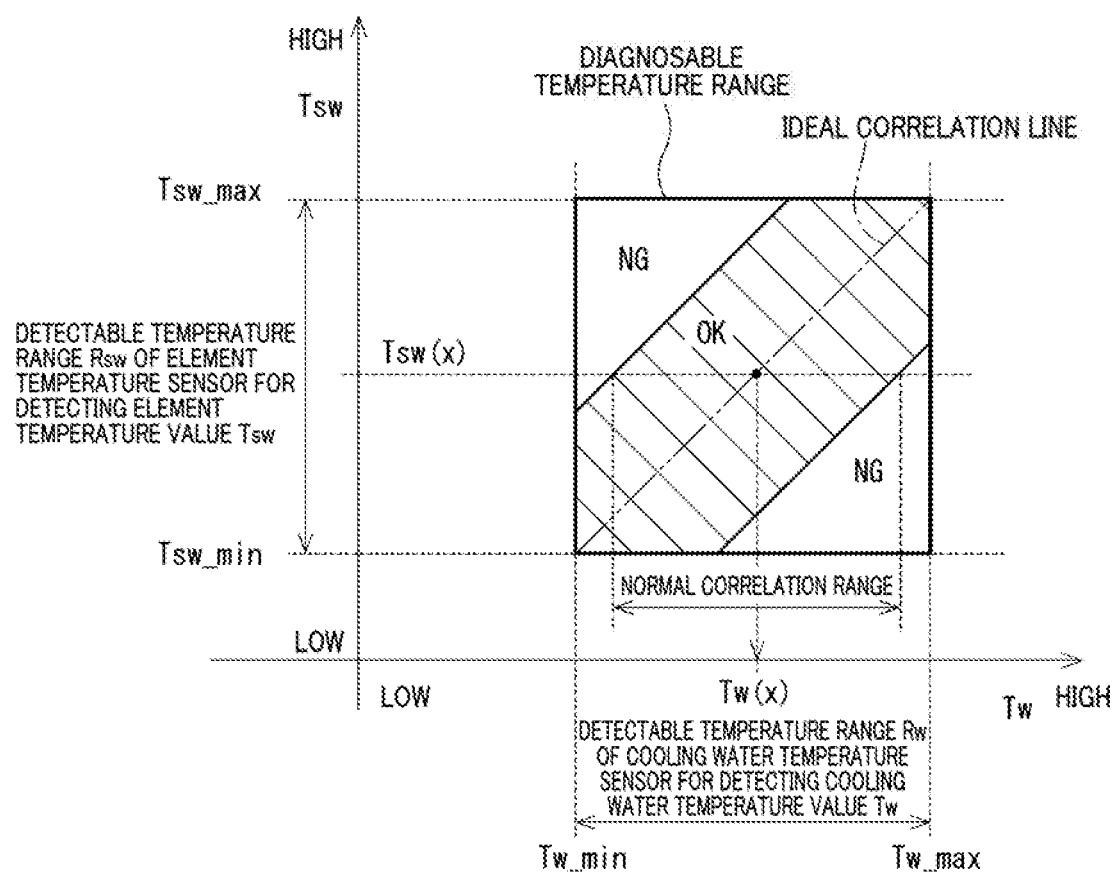
FIG. 5 is a graph showing a detectable temperature range of an element temperature sensor and a cooling water temperature sensor used by the INV ECU shown in FIG. 1 according to the first exemplary embodiment and the second exemplary embodiment.

FIG. 5 is a graph showing the detectable temperature range of the element temperature sensor 54 and the cooling water temperature sensor 55 used by the INV ECU 30 shown in FIG. 1 according to the first exemplary embodiment and the second exemplary embodiment.

In step S14, the abnormality detection part 38 detects whether the inverter temperature value Tinv is within the diagnosis executable temperature range. In the first exemplary embodiment, the INV ECU 30 uses, as the inverter temperature value Tinv, the element temperature value Tsw and the cooling water temperature value Tw.

As shown in FIG. 5, when the element temperature value Tsw is within the detectable temperature range Rsw of the element temperature sensor 54 and the cooling water temperature value Tw is within the detectable temperature range Rw of the cooling water temperature sensor 55, the INV ECU 30 determines that the inverter temperature value Tinv is within the diagnosis executable temperature range.

That is, when the following AND conditions are satisfied, the process in step S14 indicates affirmation ("YES" in step S14), $Tsw\_min <= Tsw <= Tsw\_max$, and $Tw\_min <= Tw <= Tw\_max$, where Tsw_min and Tsw_max represent the temperature lower limit value and the upper limit value of the detectable temperature range Rsw of the element temperature sensor 54, and Tw_min and Tw_max represent the temperature lower limit value and the upper limit value of the detectable temperature range Rw of the cooling water temperature sensor 55, respectively.

Figure 6A:
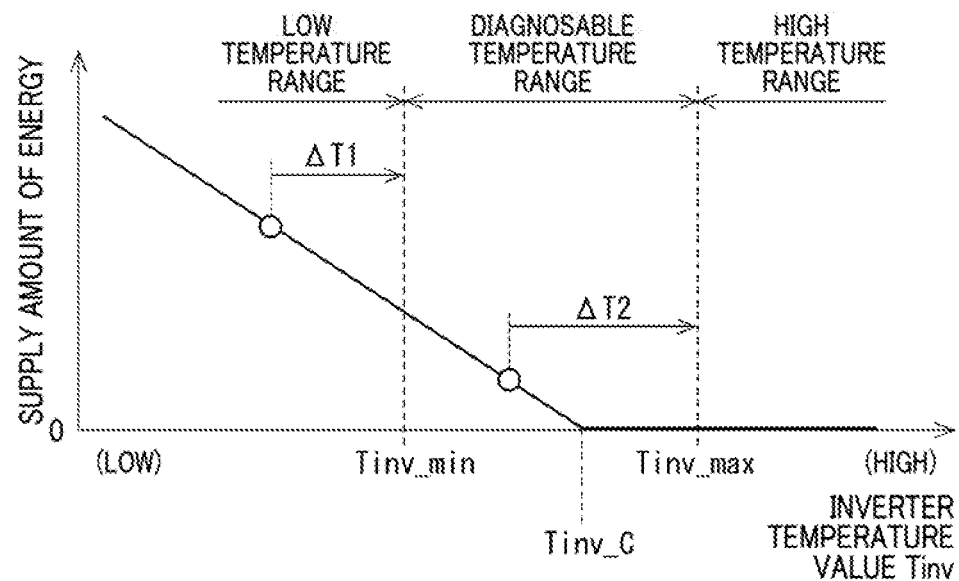
FIG. 6A is a graph showing a characteristics diagram which illustrates a relationship between an inverter temperature value of an inverter and an amount of energy to be supplied to the inverter.
Figure 6B:
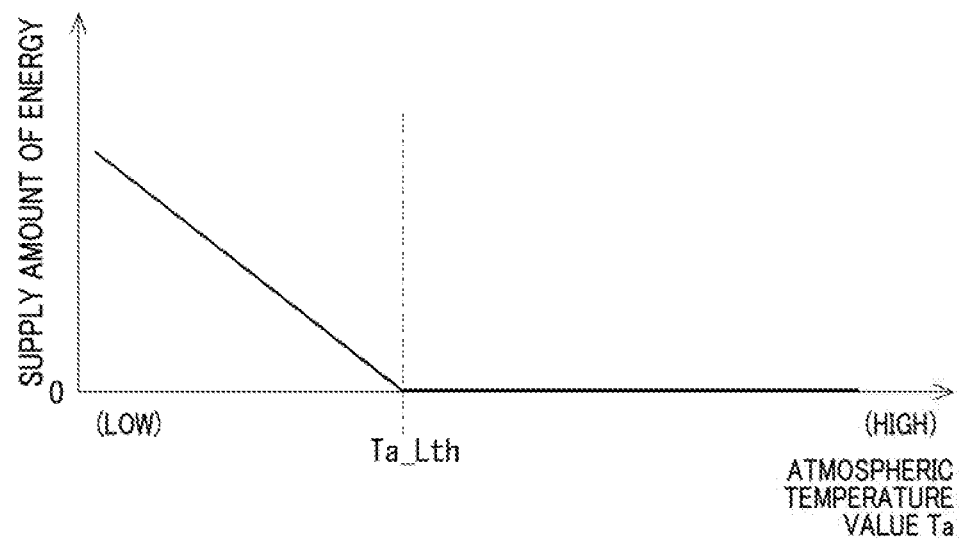
FIG. 6B is a graph showing a characteristics diagram which illustrates a relationship between an atmospheric temperature value and an amount of energy to be supplied to the inverter.

FIG. 6A is a graph showing a characteristics diagram which illustrates a relationship between the inverter temperature value Tinv of the inverter 40 and an amount of energy to be supplied to the inverter 40. FIG. 6B is a graph showing a characteristics diagram which illustrates a relationship between the atmospheric temperature value Ta and the amount of energy to be supplied to the inverter 40.

In FIG. 6A and FIG. 6B, reference characters Tinv_min and Tinv_max represent the temperature lower limit value and the temperature upper limit value of the inverter temperature value Tinv of the inverter 40 in the diagnosis executable temperature range, respectively.

The element temperature value Tsw and the cooling water temperature value Tw are in a positive correlation with each other although each of the element temperature value Tsw and the cooling water temperature value Tw has an offset due to heat transfer characteristics caused by the installed location of each of the element temperature sensor 54 and the cooling water temperature sensor 55 and a temperature detection point of each of the element temperature sensor 54 and the cooling water temperature sensor 55 in the MG control system.

When the element temperature sensor 54 and the cooling water temperature sensor 55 is operating correctly, i.e. normally operate, the cooling water temperature value Tw, which corresponds to the element temperature value Tsw (x), is within a normal correlation range around the cooling water temperature value Tw (x) on an ideal correlation line designated by the dot-dash line shown in FIG. 5.

The normal correlation range is defined on the basis of the correspondence between the element temperature value Tsw and the cooling water temperature value Tw in the normal correlation range of the cooling water temperature value Tw. This normal correlation range is designated by reference character "OK" shown in FIG. 5 (hereinafter, referred to as the normal correlation range OK).

When the element temperature value Tsw and the cooling water temperature value Tw are in the normal correlation range OK, it can be determined that each of the element temperature sensor 54 and the cooling water temperature sensor 55 is operating correctly.

On the other hand, when the element temperature value Tsw and the cooling water temperature value Tw are in an abnormality correlation range designated by reference character "NG" shown in FIG. 5 (hereinafter, referred to as the abnormality correlation range NG), it can be determined that at least one of the element temperature sensor 54 and the cooling water temperature sensor 55 is operating incorrectly.

When the detection result in step S14 indicates affirmation ("YES" in step S14), i.e. indicates that the inverter temperature value Tinv of the inverter 40 is within the diagnosis executable temperature range which satisfies the following relationships:

$$Tsw\_min<=Tsw<=Tsw\_max; \text{ and}$$
$$Tw\_min<=Tw<=Tw\_max,$$

the operation flow progresses to step S16.

In step S16, the INV ECU 30 performs the abnormality detection for the MG control system so as to detect whether the MG control system is operating correctly.

On the other hand, when the detection result in step S14 indicates negation ("NO" in step S14) i.e. indicates that the inverter temperature value Tinv of the inverter 40 is outside the diagnosis executable temperature range, the INV ECU 30 does not perform the abnormality detection, and the operation flow progresses to step S15.

In step S14, if the abnormality detection for the MG control system is not performed after the engine start of the hybrid vehicle 901 within the predetermined period of time, which has been determined by law and regulations, this event is stored into a memory unit (not shown). When the number of times of the events does not exceed the predetermined value within the predetermined period of time, the hybrid vehicle 901 does not match the laws and regulations of the country or region.

In order to avoid this, in step S15, the abnormality detection part 38 adjusts the amount of energy to be supplied to the inverter 40 so that the inverter temperature value Tinv of the inverter 40 enters the diagnosis executable temperature range and the abnormality detection for the MG control system can be correctly performed.

The INV ECU 30 as the inverter control device according to the first exemplary embodiment uses electric power as the supply energy. On the other hand, the INV ECU 30 as the inverter control device according to the second exemplary embodiment uses heat energy as the supply energy. The INV ECU 30 adjusts the amount of the electric power as the supply energy to be supplied to the inverter 40.

In an actual case in which the inverter 40 has the inverter temperature value Tinv which is less than the temperature lower limit value Tinv_min in the diagnosis executable temperature range, the abnormality detection part 38 increases the amount of electric power as the energy to be supplied to the inverter 40 so as to increase the inverter temperature value Tinv of the inverter 40.

On the other hand, when the inverter 40 has the inverter temperature value Tinv which is higher than the temperature upper limit value Tinv_max in the diagnosis executable temperature range, the abnormality detection part 38 reduces the amount of electric power to be supplied, or prohibits the supply of electric power to the inverter so as to reduce the inverter temperature value Tinv of the inverter 40. The abnormality detection part 38 adjusts the inverter 40 to forcedly reduce the energy of the inverter 40 such as the heat energy from the inverter 40, for example.

As previously described, when the positive energy is supplied to the inverter 40, the inverter temperature value Tinv of the inverter 40 increases.

Next, a description will be given of the relationship between the inverter temperature value Tinv, and the amount of energy to be supplied to the inverter 40 with reference to FIG. 6A and FIG. 6B.

As previously described, FIG. 6A is a view showing the characteristics diagram illustrating the relationship between the inverter temperature value Tinv, and the amount of energy to be supplied to the inverter 40. FIG. 6B is a view showing the characteristics diagram illustrating the relationship between the atmospheric temperature value Ta and the amount of energy to be supplied to the inverter 40.

FIG. 6A shows a low temperature range in which the inverter temperature value Tinv is lower than the temperature lower limit value Tinv_min in the diagnosis executable temperature range, and shows a high temperature range in which the inverter temperature value Tinv is higher than the temperature upper limit value Tinv_max in the diagnosis executable temperature range.

When the inverter temperature value Tinv is lower than a critical temperature Tinv_C in the diagnosis executable temperature range, the INV ECU 30 determines that the lower the inverter temperature value Tinv is, the larger the amount of energy to be supplied to the inverter 40 is. When the inverter temperature value Tinv is not less than the critical temperature value Tinv_C, the INV ECU 30 determines that the amount of energy is zero.

That is, when the inverter temperature value Tinv is lower than a critical temperature Tinv_C in the diagnosis executable temperature range, the larger the difference ΔT1 between the inverter temperature value Tinv and the temperature lower limit value Tinv_min in the diagnosis executable temperature range is, the more the abnormality detection part 38 increases the amount of energy, i.e. the electric power. This makes it possible to reduce a duration required for the inverter temperature value Tinv of the inverter to be placed into the diagnosis executable temperature range, and for the abnormality detection part 38 to quickly perform the abnormality detection.

On the other hand, when the inverter temperature value Tinv is within the diagnosis executable temperature range, the abnormality detection part 38 basically more reduces the amount of energy to be supplied to the inverter 40 with reduction of the difference ΔT2 between the inverter temperature value Tinv and the temperature upper limit value Tinv_max in the diagnosis executable temperature range.

When the inverter temperature value Tinv is within the diagnosis executable temperature range and not less than the critical temperature Tinv_C, the abnormality detection part 38 prohibits the supply of energy, i.e. the supply of the electric power to the inverter 40. In this case, no electric power is supplied to the inverter 40.

If the abnormality detection part 38 prohibits the supply of electric power to the inverter immediately when the inverter temperature value Tinv exceeds the temperature lower limit value Tinv_min in the diagnosis executable temperature range, the inverter temperature value Tinv is reduced, and becomes less than the temperature lower limit value Tinv_min in the diagnosis executable temperature range. Accordingly, it is preferable for the abnormality detection part 38 to continue the supply of electric power to the inverter for a short time after the inverter temperature value Tinv has reached the diagnosis executable temperature range.

Still further, it is possible for the abnormality detection part 38 to maintain the inverter temperature value Tinv of the inverter 40 around a middle temperature in the diagnosis executable temperature range by reducing the supply of electric power to the inverter 40 when approaching the temperature upper limit value Tinv_max In the diagnosis executable temperature range so as to prevent the inverter temperature value Tinv from exceeding the temperature upper limit value Tinv_max and to prevent occurrence of overshoot of the inverter temperature value Tinv. In a concrete example, the abnormality detection part 38 adjusts a change slope of the supply amount of electric power to the inverter temperature value Tinv or adjusts the critical temperature Tinv_C.

Still further, it is acceptable for the abnormality detection part 38 to use the atmospheric temperature Ta as a parameter. In this case, the abnormality detection part 38 adjusts the supply amount of electric power to the inverter 40 when the atmospheric temperature Ta is lower than a predetermined low temperature threshold value Ta_Lth. For example, as shown in FIG. 6B, when the atmospheric temperature Ta is lower than the predetermined low temperature threshold value Ta_Lth, the more the abnormality detection part 38 increases the supply amount of electric power to the inverter 40, the more the current supplied to the heater is increased.

Similar to the effects by increasing the supply amount of electric power to the inverter 40 with the reduction of the inverter temperature Tinv (previously described, this makes it possible to reduce the duration required for the inverter temperature value Tinv to be placed into the diagnosis executable temperature range, and for the abnormality detection part 38 to quickly perform the abnormality detection.

A description will now be given of the behavior of the INV ECU 30 as the inverter control device according to the first exemplary embodiment with reference to FIG. 7.

Figure 7:
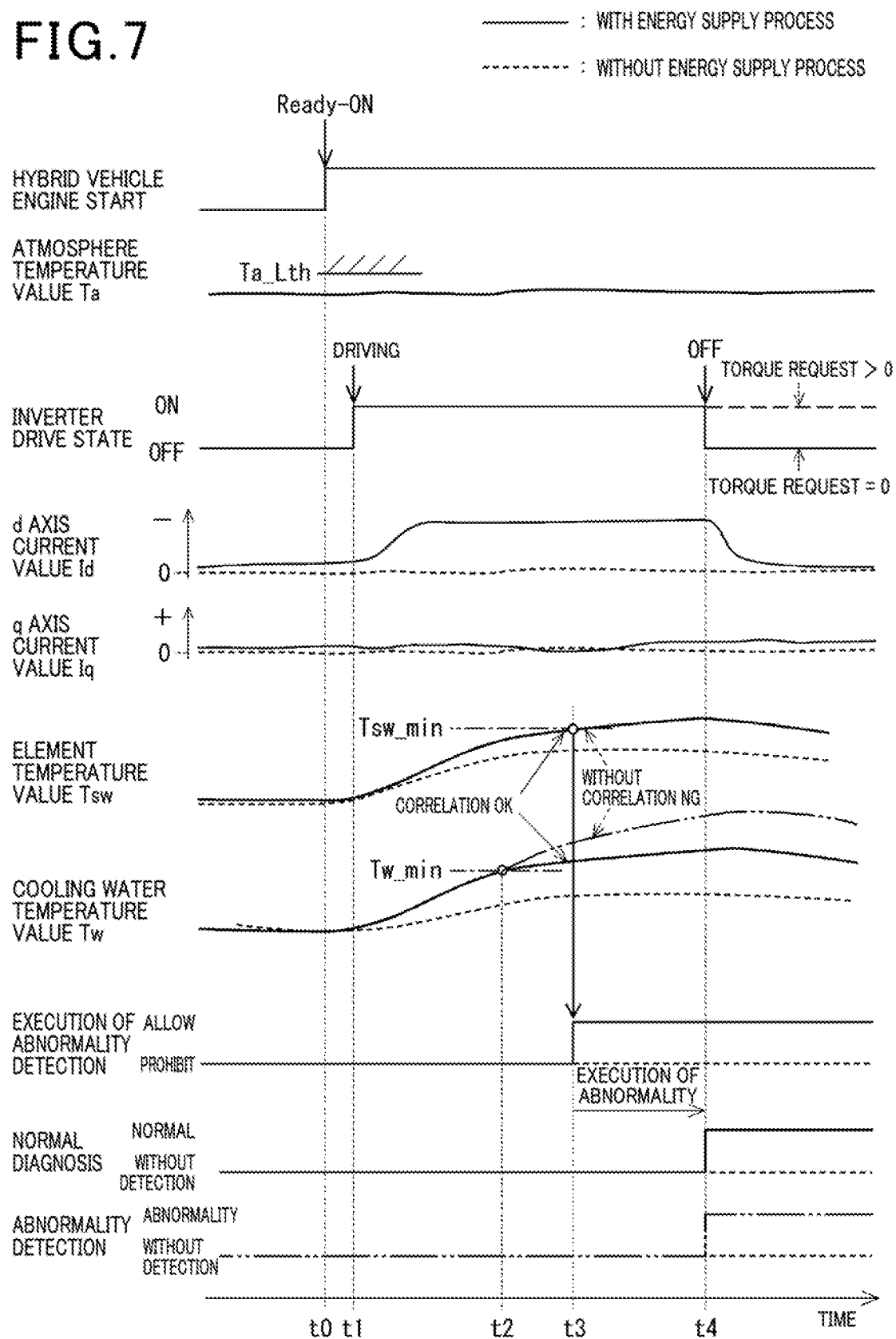
FIG. 7 is a graph showing a timing chart of the electric power supply process and the abnormality detection process performed by an abnormality detection part in the INV ECU shown in FIG. 1 according to the first exemplary embodiment and the second exemplary embodiment.

FIG. 7 is a graph showing a timing chart of the electric power supply process and the abnormality detection process performed by the abnormality detection part 38 in the INV ECU 30 shown in FIG. 1 according to the first exemplary embodiment.

In FIG. 7, the solid lines represent the variation of each of the d axis current value Id, the q axis current value Iq, the element temperature value Tsw, and the cooling water temperature value Tw when the abnormality detection part 38 in the INV ECU 30 according to the first exemplary embodiment performs the electric power supply process and the abnormality detection process. In FIG. 7, the dotted lines represents the variation of each of them when the abnormality detection part 38 does not perform the electric power supply process and the abnormality detection process.

The higher the d axis current value Id is upward in a vertical direction in FIG. 7, the more the negative value of the d axis current value Id increases. In other words, the vertical axis in the d axis current value Id in FIG. 7 indicates an absolute value of the d axis current value Id. The d axis current value Id represents an instruction value and further represents an actual current value flowing in the INV ECU 30 shown in FIG. 1.

At timing t0 shown in FIG. 7, when the driver of the hybrid vehicle 901 starts to use the engine, the atmospheric temperature value Ta is usually lower than the low temperature threshold value Ta_Lth. In a concrete example, this case usually occurs when the driver starts to uses the engine on the morning under cold conditions. That is, in this case, the atmospheric temperature value Ta becomes less than the low temperature threshold value Ta_Lth, and the abnormality detection part 38 detects that the atmospheric temperature value Ta becomes less than the low temperature threshold value Ta_Lth (NO in step S13 shown in FIG. 4). The operation flow shown in FIG. 4 progresses to step S14. In this case, in step S14, because the abnormality detection part 38 detects that the element temperature value Tsw and the cooling water temperature value Tw are lower than the element temperature lower limit value Tsw_min and the cooling water temperature lower limit value Tw_min, respectively, the abnormality detection part 38 cannot perform the abnormality detection for the MG control system after the engine start of the hybrid vehicle 901.

When the inverter 40 is turned ON so as to operate at timing t1, the electric power supply to the inverter 40 is initiated in step S15 shown in FIG. 4. At this time, the q axis current value maintains zero, and does not vary. On the other hand, the INV ECU 40 generates the control signals so as to increase the d axis current value Id, i.e. the absolute value of the d axis current value Id only.

When the d axis current flows in the inverter 40, and the switching elements 41 to 46 in the inverter 40 operate, and as a result, each of the element temperature value Tsw detected by the element temperature sensor 54 and the cooling water temperature value Tw detected by the cooling water temperature sensor 55 is increased.

At timing t2 shown in FIG. 7, the cooling water temperature value Tw reaches the cooling water temperature lower limit value Tw_min. At timing t3 shown in FIG. 7, when the element temperature Tsw reaches the element temperature lower limit value Tsw_min, because the condition in step S14 shown in FIG. 4 is satisfied, the abnormality detection part 38 can perform the abnormality detection. The abnormality detection part 38 performs the abnormality detection during the period counted from t3 to t4. At timing t4, the abnormality detection part 38 determines whether abnormality occurs in the MG control system. In more detail, the abnormality detection part 38 determines whether abnormality occurs in at least one of the element temperature sensor 54 and the cooling water temperature sensor 55 in the MG control system For example, when each of the element temperature value Tsw detected by the element temperature sensor 54 and the cooling water temperature value Tw detected by the cooling water temperature sensor 55 is within the normal correlation range OK shown in FIG. 5, the abnormality detection part 38 determines that both the element temperature sensor 54 and the cooling water temperature sensor 55 is operating correctly.

On the other hand, when each of the element temperature value Tsw detected by the element temperature sensor 54 and the cooling water temperature value Tw detected by the cooling water temperature sensor 55 is within the abnormality correlation range NG shown in FIG. 5, the abnormality detection part 38 determines at least one of the element temperature sensor 54 and the cooling water temperature sensor 55 is operating incorrectly.

When the element temperature value Tsw varies as designated by the solid line shown in FIG. 7, the abnormality detection part 38 determines that both the element temperature sensor 54 and the cooling water temperature sensor 55 is operating correctly because the cooling water temperature value Tw and the element temperature value Tsw are within the normal correlation range OK.

On the other hand, when the element temperature value Tsw varies after timing t2 as designated by the two-dot chain line shown in FIG. 7, the abnormality detection part 38 determines that at least one of the element temperature sensor 54 and the cooling water temperature sensor 55 is operating incorrectly, i.e. is in a sensor failure because the cooling water temperature value Tw and the element temperature value Tsw are within the abnormality correlation range NG.

When the abnormality detection part 38 determines that the element temperature sensor 54 and the cooling water temperature sensor 55 is operating correctly or one of them is operating incorrectly at timing t4, it is not necessary to supply electric power to the inverter so as to increase the temperature of the inverter 40.

When the torque request transmitted to the drive control part 310 from the driver of the hybrid vehicle 901 is substantially zero after consideration an error, etc., the INV ECU 30 stops the inverter 40 operating. This makes it possible to reduce the electric power consumption of the MG control system.

As designated by the long dotted line shown in FIG. 7, when the torque request is substantially not less than zero, the INV EVU 30 continues the operation of the inverter 40.

Second Exemplary Embodiment

A description will be given of the INV ECU 30 according to the second exemplary embodiment. The INV ECU 30 according to the second exemplary embodiment has the same structure of the INV ECU according to the first exemplary embodiment shown in FIG. 1 to FIG. 3.

In particular, the INV ECU 30 according to the second exemplary embodiment adjusts the heat energy to be supplied to the inverter 40 when the inverter temperature value Tinv of the inverter 40 is outside the diagnosis executable temperature range. In other words, the INV ECU 30 according to the second exemplary embodiment adjusts the heat energy to be supplied to the inverter 40. On the other hand, as previously described, the INV ECU 30 according to the first exemplary embodiment adjusts the amount of electric power to be supplied to the inverter 40 when the inverter temperature value Tinv of the inverter 40 is outside the diagnosis executable temperature range.

As shown by the dotted line shown in FIG. 3, the INV ECU 30 according to the second exemplary embodiment is equipped with the heating and cooling device 48 capable of externally heating and cooling the cooling water and the switching elements 41 to 46 in the inverter 40. The heating and cooling device 48 is assembled with a heater such as a PTC heater, a cooling fan or a combination of the PTC heater and the cooling fan. It is acceptable for the INV ECU 30 according to the second exemplary embodiment to eliminate the current correction part 32 from the structure of the INV ECU 30 or to use the current correction part 32.

When the inverter temperature Tinv is lower than the temperature lower limit value Tinv_min in the diagnosis executable temperature range, the abnormality detection part 38 instructs the heating and cooling device 48 to heat the inverter 40, i.e. to supply heat energy to the inverter 40. This externally heats the inverter 40.

On the other hand, when the inverter temperature Tinv is higher than the temperature upper limit value Tinv_max in the diagnosis executable temperature range, the abnormality detection part 38 instructs the heating and cooling device 48 to supply negative energy to the inverter 40, for example, to supply the cooling water to the inverter 40. This externally cools the inverter 40.

Like the first exemplary embodiment, the INV ECU 30 according to the second exemplary embodiment to place an inverter temperature of the inverter 40 into the diagnosis executable temperature range so as to quickly perform the abnormality detection.

It is possible to combine the structure of the INV ECU 30 according to the second exemplary embodiment with the INV ECU 30 according to the first exemplary embodiment so as to supply electric power and heat energy to the inverter 40.

(Effects of the Structure of the INV ECU 30 According to the Second Exemplary Embodiment)

As previously described, when the inverter temperature value Tinv of the inverter 40 is outside the diagnosis executable temperature range when the hybrid vehicle 901 starts to use the engine, the INV ECU 30 according to the second exemplary embodiment performs the energy supply control for adjusting heat energy, i.e. for supplying heat energy to the inverter 40 so as to increase the temperature of the inverter 40, to allow the inverter 40 to quickly enter the diagnosis executable temperature range, and to speedily perform the abnormality detection. This control makes it possible to increase the execution frequency of performing the abnormality detection for the MG control system within the predetermined period of time counted from the engine start of the hybrid vehicle 901. This control makes it possible to quickly avoid a disadvantageous condition of the hybrid vehicle which does not match the laws and regulations even if the hybrid vehicle is in severe cold environment such as under cold conditions.

When the abnormality detection result indicates that the MG control system is in the abnormality state, the INV ECU 30 uses known abnormality countermeasures. This makes it possible to prevent the exhaust emission amount from increasing due to excessive engine driving of the hybrid vehicle 901.

When the INV ECU 30 uses one or more temperature sensors having a wide temperature range, which expands the diagnosis executable temperature range, so as to satisfy the maximum temperature range when the hybrid vehicle 901 starts to uses the engine, this increases the manufacturing cost of the INV ECU 30 and the MG control system.

The INV ECU 30 according to the second exemplary embodiment has the improved structure capable of adjusting the energy to be supplied to the inverter 40 without using any expensive temperature sensor, and capable of increasing the number of times to perform the abnormality detection within the predetermined period of time counted from the engine start of the hybrid vehicle 901.

Still further, in the improved structure of the INV ECU 30 according to the second exemplary embodiment, the diagnosis executable temperature range is determined and adjusted on the basis of the detectable temperature range of the inverter temperature sensor 54 which detects the inverter temperature value Tinv. This avoids the incorrect execution of the abnormality detection in the condition which is outside the temperature detectable range of each temperature sensor.

Third Exemplary Embodiment

A description will be given of the INV ECU 30 according to a third exemplary embodiment with reference to FIG. 8 to FIG. 10.

FIG. 8 is a view showing a schematic structure of the MG control system mounted on a plug-in type hybrid vehicle 903, to which an INV ECU 30 according to the third exemplary embodiment of the present invention is applied. As shown in FIG. 8, the INV ECU 30 according to the third exemplary embodiment is applied to the MG control system or a MG drive system for the plug-in type hybrid vehicle 903.

The plug-in type hybrid vehicle 903 is equipped with a power supply connector 17. An external plug-in cable 16 is connected to the power supply connector 17 in the plug-in type hybrid vehicle 903 so as to supply electric power to the plug-in type hybrid vehicle 903.

In more detail, first terminals of an external power supply relay 18 are connected to the power supply connector 17, and second terminals of the external power supply relay 18 are connected to a high voltage line P and a low voltage line N, respectively, between the battery 11 and the inverter 40.

For example, the battery 11 is arranged at a location close to the substrate (not shown) on which the inverter 40, etc. are arranged.

The battery charges electric power and supplies the charged electric power. Those charging and discharging electric power in the battery 11 generates heat energy. The heat energy radiated from the battery 11 is externally supplied to the inverter 40.

The INV ECU 30 according to the third exemplary embodiment uses a plug-in hybrid vehicle (PHV) ECU 25 shown in FIG. 8, instead of using the HV ECU 20 shown in FIG. 1.

The PHV ECU 25 turns on the external power supply relay 18 so as to receive external electric power supplied through the plug-in cable 16 and to supply the received external electric power to the high voltage line P and the low voltage line N when a state of charge (SOC) of the battery 11 is lower than a predetermined lower limit SOC. This process makes it possible to supply the external electric power to the battery 11 and an input-side capacitor 13 of the inverter 40. When the SOC of the battery 11 reaches the predetermined SOC, the PHV ECU 25 turns off the external power supply relay 18 to prohibit overcharge of the battery 11.

Figure 9:
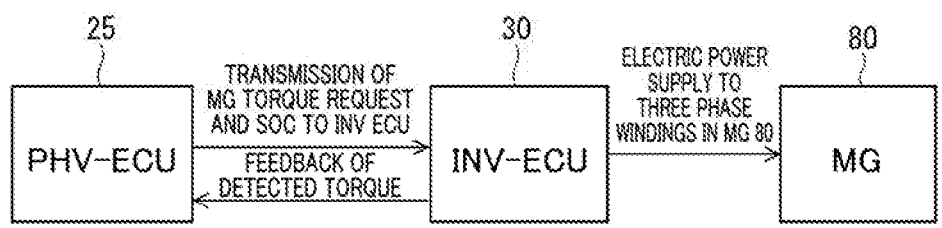
FIG. 9 is a view showing a brief structural relationship between the HV ECU, the INV ECU and the motor generator in the MG control system shown in FIG. 8.

FIG. 9 is a view showing a brief structural relationship between the PHV ECU 25, the INV ECU 30 and the MG 80 in the MG control system shown in FIG. 8. As shown in FIG. 9, the PHV ECU 25 transmits, to the INV ECU 30, the MG torque request instructed by the driver of the plug-in hybrid vehicle 903, like the operation of the HV ECU 20 shown in FIG. 2. In addition to this, the PHV ECU 25 transmits information regarding the SOC of the battery 11 (hereinafter, referred to as the SOC information) to the INV ECU 30. Because the third exemplary embodiment, and the first and second exemplary embodiments have the same behavior of each of the INV ECU 30 and the MG 80, the explanation of the same behavior of each of the INV ECU 30 and the MG 80 is omitted here for brevity.

Figure 10:
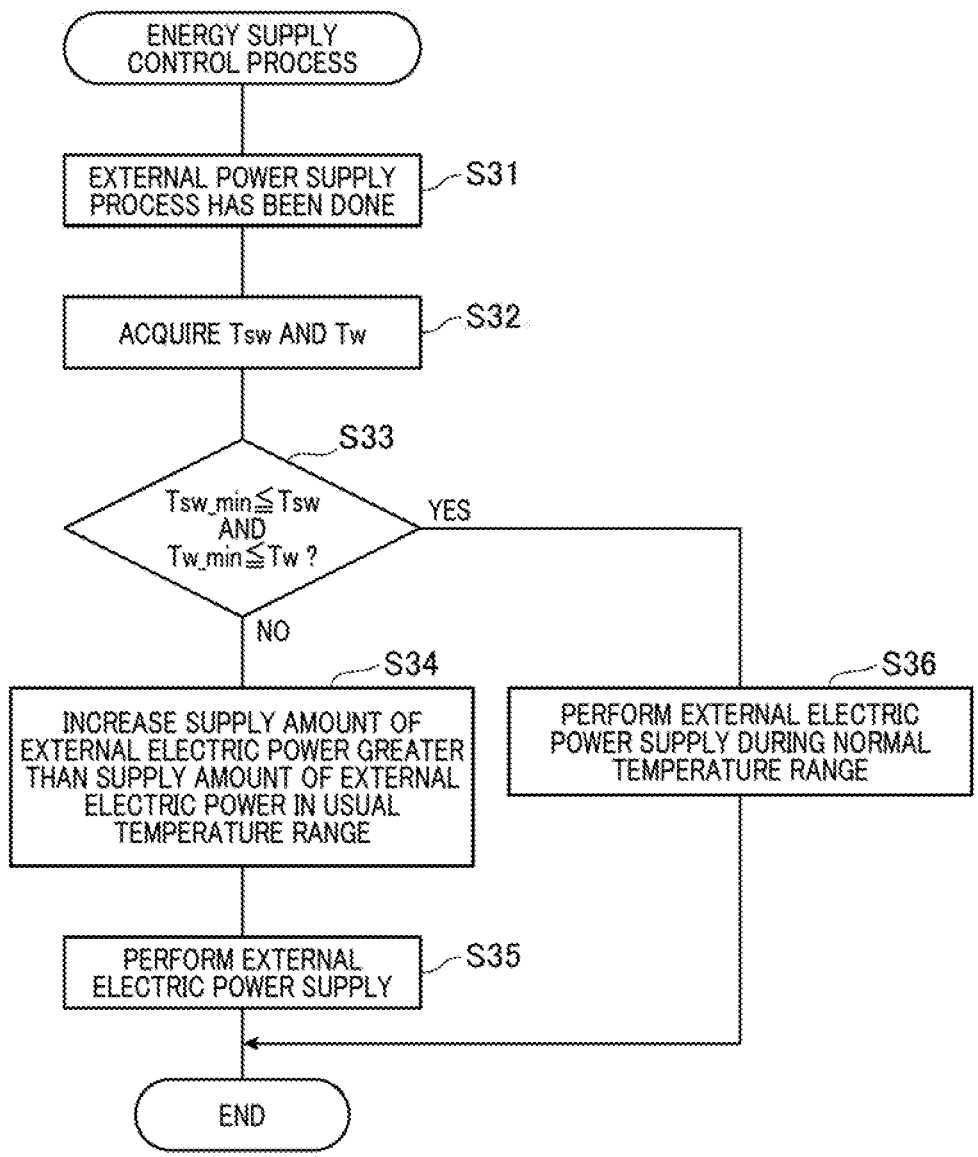
FIG. 10 is a view showing a flow chart of an energy supply control process performed by the abnormality detection part in the INV ECU shown in FIG. 8 according to the third exemplary embodiment.

FIG. 10 is a view showing a flow chart of the energy supply control process performed by the abnormality detection part 38 in the INV ECU 30 shown in FIG. 8 according to the third exemplary embodiment. That is, FIG. 10 shows the energy supply control process performed by the abnormality detection part 38 in the INV ECU 30 when the inverter temperature value Tinv of the inverter 40 is lower than the temperature lower limit value such as the element temperature lower limit value Tsw_min and the cooling water temperature lower limit value Tw_min in the diagnosis executable temperature range.

The third exemplary embodiment omits from the explanation for brevity a case when inverter temperature value Tinv of the inverter 40 exceeds, i.e. Is higher than, the temperature upper limit value Tinv_max in the diagnosis executable temperature range.

In step S31 shown in FIG. 10, the plug-in cable 16 has being connected to the power supply connector 17 in the MG control system shown in FIG. 8. That is, the external power supply process has been done. The operation flow progresses to step S32.

In step S32, the temperature information acquiring part 37 acquires, as at least the inverter temperature value Tinv, the element temperature value Tsw detected by and transmitted from the element temperature sensor 54, the cooling water temperature value Tw detected by and transmitted from the cooling water temperature sensor 55. The operation flow progresses to step S33.

In step S33, the abnormality detection part 38 detects whether the inverter temperature value Tinv is not less than the temperature lower limit value in the diagnosis executable temperature range, i.e. whether the element temperature value Tsw is not less than the element temperature lower limit value Tsw_min and the cooling water temperature value Tw is not less than the cooling water temperature lower limit value Tw_min. The abnormality detection part 38 transmits the detection result in step S33 to the PHV ECU 25.

When the detection result in step S33 indicates negation ("NO" in step S33), i.e. indicates that element temperature value Tsw is less than the element temperature lower limit value Tsw_min or the cooling water temperature value Tw is less than the cooling water temperature lower limit value Tw_min, the operation flow progresses to step S34.

In step S34, the PHV ECU 25 increases the supply amount of external electric power to the inverter 40, etc. greater than the supply amount of external electric power in the usual temperature state of the inverter 40 in which the inverter temperature value Tinv is not less than the inverter temperature lower limit value in the diagnosis executable temperature range. After this, when this condition has been satisfied, the INV ECU 30 performs the power supply of external electric power. For example, in order to expand the range of the SOC of the battery 11 to perform the supply of the external electric power to the plug-in type hybrid vehicle 903 during the normal temperature range, the PHV ECU reduces the lower limit SOC at which the supply of the external electric power to the plug-in type hybrid vehicle 903 is initiated.

The more the supply amount of the external electric power to the plug-in type hybrid vehicle 903 increases, the more the heat energy generated due to the charging and discharging of the battery 11 increases, and the more the generated heat energy to be supplied to the inverter 40 increases.

On the other hand, when the detection result in step S33 indicates affirmation ("YES" in step S33), i.e. Indicates that element temperature value Tsw is not less than the element temperature lower limit value Tsw_min or the cooling water temperature value Tw is not less than the cooling water temperature lower limit value Tw_min, the operation flow progresses to step S36.

In step S36, the external electric power is supplied to the plug-in type hybrid vehicle 903 during the normal temperature range.

As previously described, the structure of the INV ECU 30 and the PHV ECU 25 according to the third exemplary embodiment increases a temperature of the inverter 40 with high efficiency by using heat energy generated in the battery 11 which is generated when the external electric power is supplied to the plug-in type hybrid vehicle 903. Because this control process can place an inverter temperature of the inverter 40 into the diagnosis executable temperature range, it is possible for the INV ECU 30 according to the third exemplary embodiment to quickly perform the abnormality detection.

In a case when the detection result in step S33 indicates negation ("NO" in step S33) as previously described, it is acceptable to use another countermeasure to promote heat transfer from the battery 11 to the inverter 40 or to supply the external electric power directly to the inverter 40, instead of supplying such heat energy to the inverter 40.

(Other Modifications)

The concept of the present invention is not limited by the cases according to the first to third exemplary embodiments. For example, it is possible for the present invention to provide various modifications of the first to third exemplary embodiments.

(a) In the structure shown in FIG. 1 and the structure shown in FIG. 8, the INV ECU 30 has the temperature information acquiring part 37 and the abnormality detection part 38 therein. However, the concept of the present invention is not limited by this structure. For example, it is possible to arrange the temperature information acquiring part 37 and the abnormality detection part 38 on another substrate which is different from the substrate on which the drive control part 310 in the INV ECU 30 is mounted. For example, it is acceptable to have a structure in which the function of both the temperature information acquiring part 37 and the abnormality detection part 38, or the function of the temperature information acquiring part 37 only, or the function of the abnormality detection part 38 only, are mounted on the substrate on which the HV ECU 20 and the PHV ECU 25 are mounted. In the latter case, the inverter control device equipped with the temperature acquiring part and the abnormality detection part are formed in the INV ECU 30, the HV ECU 20 or the PHV ECU 25.

Figure 11:
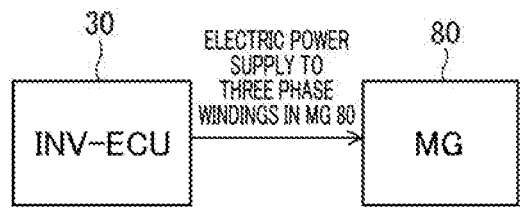
FIG. 11 is a view showing a brief structural relationship between the HV ECU and the motor generator in the MG control system according to a modification of the first to third exemplary embodiments of the present invention.

(b) FIG. 11 is a view showing a brief structural relationship between the INV ECU 30 and the MG 80 in the MG control system according to a modification of the first to third exemplary embodiments of the present invention. In the structure of the first to third exemplary embodiments, the HV ECU 20 and the PHV ECU 25, as an upper hierarchy side ECU in the MG control system, transmit the torque request for the MG 80 to the drive control part 310 in the INV ECU 30 shown in FIG. 2 and FIG. 9. However, the concept of the present invention is not limited by those structures. For example, as shown in FIG. 11, it is acceptable for the INV ECU 30 to directly drive the MG 80. The INV ECU 30 calculates the amount of electric power to be supplied to the MG 80 on the basis of the torque request indicated by the driver of the hybrid vehicle 901 or the plug-in hybrid vehicle 903. The MG 80 is drives by the electric power supplied from the inverter 40.

(c) The temperature information acquiring part 37 in the INV ECU 30 as the inverter control device according to the first to third exemplary embodiments acquires the atmospheric temperature value Ta in addition to the element temperature value Tsw of the switching element 44 and the cooling water temperature value Tw of cooling water. In step S13 in the flow chart shown in FIG. 4, the INV ECU 30 performs the abnormality detection on the basis of the acquired atmospheric temperature value Ta. It is also acceptable for the INV ECU 30 to perform the step S14 to detect feasibility of the abnormality detection without perform the step S13 shown in FIG. 4.

(d) As shown in FIG. 5, the diagnosis executable temperature range is determined on the basis of the inverter temperature value Tinv, the detectable temperature range Rsw of the element temperature sensor 54 and the detectable temperature range Rw of the cooling water temperature sensor 55. However, the concept of the present invention is not limited by this. It is also possible to determine the diagnosis executable temperature range on the basis of a temperature range which satisfies a temperature state to perform the abnormality detection. For example, it is possible to determine the diagnosable temperature range which is within the detectable temperature range Rsw of the element temperature sensor 54, the detectable temperature range Rw of the cooling water temperature sensor 55 and within a temperature range which is not more than a predetermined value of a calculation error of an arithmetic circuit in the INV ECU 30, etc.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An inverter control device capable of performing control of behavior of an inverter, the inverter supplying electric power to a motor generator in a hybrid vehicle equipped with an internal combustion engine and at least one motor generator as driving power sources, the inverter control device comprising a computer system including a central processing unit, the computer system being configured to:

generate inverter drive signals on the basis of a torque request to the at least one motor generator;

acquire an inverter temperature value detected by at least one temperature sensor;

detect whether the inverter temperature value is within a diagnosable temperature range;

perform an abnormality detection for a control system in the motor generator mounted on the hybrid vehicle based on a determination that the inverter temperature value is within the diagnosable temperature range, the diagnosable temperature range being a temperature range outside of which the abnormality detection for the control system cannot be correctly performed;

increase a supply amount of energy supplied to the inverter so as to place the inverter temperature value into the diagnosable temperature range in response to a determination that the inverter temperature value is lower than a temperature lower limit value of the diagnosable temperature range and to perform the abnormality detection based on the determination that the inverter temperature value is outside the diagnosable temperature range; and based on the determination that the inverter temperature value is within the diagnosable temperature range, reduce the supply amount of energy supplied to the inverter as a difference between the inverter temperature value and a temperature upper limit value becomes lower.

2. The inverter control device according to claim 1, wherein the computer system is configured to use the diagnosable temperature range which is determined on the basis of a detectable temperature range of the temperature sensor.

3. The inverter control device according to claim 1, wherein the computer system is configured to detect, as the inverter temperature value, an element temperature value of switching elements which form the inverter, or a cooling water temperature value of cooling water which cools the inverter.

4. The inverter control device according to claim 1, wherein the computer system is configured to increase the supply amount of energy to the inverter with increase of a difference between the inverter temperature value and the temperature lower limit value of the diagnosable temperature range based on the determination that the inverter temperature value is lower than the temperature lower limit value in the diagnosable temperature range.

5. The inverter control device according to claim 1, wherein based on the determination that the inverter temperature value is within the diagnosable temperature range and not less than a predetermined temperature value, the computer system is configured to prohibit the supply of energy to the inverter.

6. The inverter control device according to claim 1, wherein the computer system is configured to acquire an atmospheric temperature value of atmosphere around the inverter, and based on a determination that the atmospheric temperature value is lower than a predetermined temperature threshold value, adjust the energy to be supplied to the inverter.

7. The inverter control device according to claim 6, wherein the computer system is configured to increase the supply of energy to the inverter with reduction of the atmospheric temperature value.

8. The inverter control device according to claim 1, wherein electric power is the energy supplied to the inverter.

9. The inverter control device according to claim 8, wherein after the execution of the abnormality detection in which electric power is supplied to the inverter, the computer system is configured to stop the inverter operating based on a determination that the torque request received by a computer system part is zero.

10. The inverter control device according to claim 1, wherein the computer system is configured to use, as the inverter temperature value, an element temperature value of switching elements which form the inverter, or a cooling water temperature value of cooling water which cools the inverter, and the computer system is configured to supply, as the energy to be supplied to the inverter, external heat energy to one of the switching elements in the inverter and the cooling water.

11. The inverter control device according to claim 1, wherein the computer system is configured to detect, as occurrence of abnormality in a motor generator control system, occurrence of demagnetization characteristics of the motor generator.

12. The inverter control device according to claim 1, wherein the inverter control device is applied to a plug-in hybrid vehicle, and based on the determination that the inverter temperature value is lower than the temperature lower limit value in the diagnosable temperature range, the computer system is configured to increase the supply amount of external electric power to the inverter to be greater than the supply amount of the external electric power based on the determination that the inverter temperature value is not less than the temperature lower limit value in the diagnosable temperature range.

13. An inverter control device capable of performing control of behavior of an inverter, the inverter supplying electric power to a motor generator in a hybrid vehicle equipped with an internal combustion engine and at least one motor generator as driving power sources, the inverter control device comprising a computer system including a central processing unit, the computer system being configured to:

generate inverter drive signals on the basis of a torque request to the at least one motor generator;

acquire an inverter temperature value detected by at least one temperature sensor;

detect whether the inverter temperature value is within a diagnosable temperature range;

perform an abnormality detection for a control system in the motor generator mounted on the hybrid vehicle based on a determination that the inverter temperature value is within the diagnosable temperature range, the diagnosable temperature range being a temperature range outside of which the abnormality detection for the control system cannot be correctly performed;

increase a supply amount of energy supplied to the inverter based on a determination that the inverter temperature value is lower than a temperature lower limit value of the diagnosable temperature range to be more than the supply amount of energy supplied to the inverter based on a determination that the inverter temperature value is within the diagnosable temperature range, so as to place the inverter temperature value into the diagnosable temperature range; and based on the determination that the inverter temperature value is within the diagnosable temperature range, reduce the supply amount of energy supplied to the inverter as a difference between the inverter temperature value and a temperature upper limit value becomes lower.

14. An inverter control device capable of performing control of behavior of an inverter, the inverter supplying electric power to a motor generator in a hybrid vehicle equipped with an internal combustion engine and at least one motor generator as driving power sources, the inverter control device comprising a computer system including a central processing unit, the computer system being configured to:

generate inverter drive signals on the basis of a torque request to the at least one motor generator;

acquire an inverter temperature value detected by at least one temperature sensor;

detect whether the inverter temperature value is within a diagnosable temperature range;

perform an abnormality detection for a control system in the motor generator mounted on the hybrid vehicle based on a determination that the inverter temperature value is within the diagnosable temperature range, the diagnosable temperature range being a temperature range outside of which the abnormality detection for the control system cannot be correctly performed;

continue a supply amount of energy supplied to the inverter from a determination that the inverter temperature is lower than a temperature lower limit value of the diagnosable temperature range to a determination that the inverter temperature exceeds the temperature lower limit value and is within the diagnosable temperature range; and based on the determination that the inverter temperature value is within the diagnosable temperature range, reduce the supply amount of energy supplied to the inverter as a difference between the inverter temperature value and a temperature upper limit value becomes lower.

* * * * *